United States Patent [19]
Li et al.

[11] Patent Number: 6,074,572
[45] Date of Patent: Jun. 13, 2000

[54] GAS MIXTURE FOR CRYOGENIC APPLICATIONS

[75] Inventors: Hong Li; Daniel Taut; Eugene Reu; Eric Ryba, all of San Diego, Calif.

[73] Assignee: CryoGen, Inc., San Diego, Calif.

[21] Appl. No.: 09/286,826

[22] Filed: Apr. 6, 1999

[51] Int. Cl.$^7$ ............................................. C09K 5/04
[52] U.S. Cl. ............................. 252/67; 62/51.2; 62/114
[58] Field of Search ............................ 252/67; 62/114, 62/51.2

[56] References Cited

U.S. PATENT DOCUMENTS

| | | | |
|---|---|---|---|
| 5,269,879 | 12/1993 | Rhoades et al. | 156/643 |
| 5,340,490 | 8/1994 | Decaire et al. | 252/67 |
| 5,351,499 | 10/1994 | Takemasa et al. | 62/114 |
| 5,758,505 | 6/1998 | Dobak, III et al. | 62/6 |
| 5,766,503 | 6/1998 | Shiflett et al. | 252/67 |
| 5,956,958 | 9/1999 | Dobak, III et al. | 62/114 |

*Primary Examiner*—Christine Skane
*Attorney, Agent, or Firm*—Gerald W. Spinks

[57] ABSTRACT

An optimum gas mixture formulated from a group of component fluids, for use in a miniature mixed gas refrigeration system. The gas mixture has appropriate components, in appropriate concentrations, to optimize refrigeration power and heat transfer capacity, and to minimize plugging of the Joule-Thomson expansion element. The gas mixture is pressurized by a compressor to a pressure less than 750 psia, and preferably less than 420 psia, for safety reasons, and supplied to a heat exchanger. The high pressure outlet of the heat exchanger is connected to a Joule-Thomson expansion element where the high pressure gas is expanded isenthalpically to a lower temperature at least as low as 183K. This low temperature gas cools a heat transfer element mounted in the distal end of the probe, to cool an external object. Return gas flows back through the heat exchanger to pre-cool the incoming high pressure gas mixture.

2 Claims, No Drawings

GAS MIXTURE FOR CRYOGENIC APPLICATIONS

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention is in the field of cooling small areas of biological tissue to very low temperatures.

2. Background Information

It may be desirable to be able to cool miniature discrete portions of biological tissue to very low temperatures in the performance of cryosurgery, without substantially cooling adjacent tissues of the organ. Cryosurgery has become an important procedure in medical, dental, and veterinary fields. Particular success has been experienced in the specialties of gynecology and dermatology. Other specialties, such as neurosurgery, cardiology, and urology, could also benefit from the implementation of cryosurgical techniques, but this has only occurred in a limited way. Unfortunately, currently known cryosurgical instruments have several limitations which make their use difficult or impossible in some such fields. Specifically, known systems are not optimally designed to have sufficient precision and flexibility to allow their widespread use endoscopically and percutaneously.

In the performance of cryosurgery, it is typical to use a cryosurgical application system designed to suitably freeze the target tissue, thereby destroying diseased or degenerated cells in the tissue. The abnormal cells to be destroyed are often surrounded by healthy tissue which must be left uninjured. The particular probe or other applicator used in a given application is therefore designed with the optimum shape and size for the application, to achieve this selective freezing of tissue. Where a probe is used, the remainder of the refrigeration system must be designed to provide adequate cooling, which involves lowering the operative portion of the probe to a desired temperature, and having sufficient power or capacity to maintain the desired temperature for a given heat load. The entire system must be designed to place the operative portion of the probe at the location of the tissue to be frozen, without having any undesirable effect on other organs or systems.

Currently known cryosurgical systems typically use liquid nitrogen or nitrous oxide as coolant fluids. Liquid nitrogen is usually either sprayed onto the tissue to be destroyed, or it is circulated to cool a probe which is applied to the tissue. Liquid nitrogen has an extremely low temperature of approximately 77K, making it very desirable for this purpose. However, liquid nitrogen typically evaporates and escapes to the atmosphere during use, requiring the continual replacement of storage tanks. Further, since the liquid is so cold, the probes and other equipment used for its application require vacuum jackets or other types of insulation. This makes the probes relatively complex, bulky, and rigid, and therefore unsuitable for endoscopic or intravascular use. The need for relatively bulky supply hoses and the progressive cooling of all the related components make the liquid nitrogen instruments less than comfortable for the physician, as well, and they can cause undesired tissue damage.

A nitrous oxide system typically achieves cooling by pressurizing the gas and then expanding it through a Joule-Thomson expansion element, such as a valve, orifice, or other type of flow constriction, at the end of a probe tip. Any such device will be referred to hereinafter simply as a Joule-Thomson "expansion element". The typical nitrous oxide system pressurizes the gas to 700 to 800 psia., to reach practical temperatures of no lower than about 190K to 210K. Nitrous oxide systems are not able to approach the temperature and power achieved by the nitrogen systems. The maximum temperature drop that can be achieved in a nitrous oxide system is to 184K, which is the boiling point of nitrous oxide. The nitrous oxide system does have some advantages, in that the inlet high pressure gas is essentially at room temperature until it reaches the Joule-Thomson element at the probe tip. This eliminates the need for insulation of the system, facilitating miniaturization and flexibility to some extent. However, because of the relatively warm temperatures and low power, tissue destruction and other applications are limited. For many such applications, temperatures below 184K are desirable. Further, the nitrous oxide must typically be vented to atmosphere after passing through the system, since affordable compressors suitable for achieving the high pressures required are not reliable and readily commercially available.

In most Joule-Thomson systems, single non-ideal gasses are pressurized and then expanded through a throttling component or expansion element, to produce isenthalpic cooling. The characteristics of the gas used, such as boiling point, inversion temperature, critical temperature, and critical pressure determine the starting pressure needed to reach a desired cooling temperature. Joule-Thomson systems typically use a recuperative heat exchanger to cool the incoming high pressure gas with the outgoing expanded gas, to achieve a higher drop in temperature upon expansion and greater cooling power. For a given Joule-Thomson system, the desired cooling dictates the required heat exchanger capacity.

A dramatic improvement in cooling in Joule-Thomson systems can be realized by using an optimum mixture of gasses rather than a single gas. For example, the addition of hydrocarbons to nitrogen can increase the cooling power and temperature drop for a given inlet pressure. Further, it is possible to reduce the pressure and attain performance comparable to the single gas system at high pressure. The improvement in cooling performance realized by mixed gas systems is very desirable for medical and other microminiature systems.

Some mixed gas systems have been designed where high pressure is not a major concern, and where bulky high efficiency heat exchangers can be used, but they are typically used in defense and aerospace applications.

Cryosurgical probes and catheters must have a relatively low operating pressure for safety reasons. The probe or catheter must have the cooling capacity to overcome the ambient heat load, yet it must be able to achieve a sufficiently low temperature to destroy the target tissue. Finally, the cold heat transfer element must be limited to the tip or end region of the probe or catheter, in order to prevent the damaging of tissue other than the target tissue.

It is an object of the present invention to provide an optimum fluid mixture for use in a miniature mixed gas refrigeration system which is capable of achieving a cooling temperature of 183K or less, utilizing a high pressure of no greater than 420 psia., with components capable of fitting within a miniature delivery system such as a cryosurgical probe or transvascular cardiac catheter.

BRIEF SUMMARY OF THE INVENTION

The present invention involves the operation of a miniature refrigeration system, with an optimum fluid mixture for use as the cooling medium. The term "gas mixture" will be used to some extent in the present application, but it should be understood that this term is not intended to be limited to mixtures having no liquid components, in view of the well known fact that most compositions commonly referred to as gases actually have some liquid content at some temperatures and pressures. The refrigeration system has a compressor for compressing a gas mixture to a pressure up to 750 psia, and preferably less than 420 psia. The high pressure gas mixture from the compressor is fed into a counterflow heat exchanger. The high pressure gas mixture passes through a high pressure supply passageway within the heat exchanger and exits through a port at the distal end of the heat exchanger. The high pressure distal port is connected to the inlet of a Joule-Thomson expansion element, in which the gas mixture is expanded to a lower pressure and a temperature at least as low as 183K.

The gas mixture escaping from the Joule-Thomson expansion element is exposed to the inner surface of a heat transfer element mounted in the wall of the catheter, or at the distal end of the Joule-Thomson expansion element of the probe. The expanded gas mixture cools the heat transfer element to a temperature of at least as low as 183K and then returns through the low pressure return passageway of the heat exchanger. This cools the high pressure gas from its original ambient temperature to a lower temperature. From the low pressure outlet of the heat exchanger, the expanded gas mixture returns to the compressor.

The heat transfer element can take the optimum shape for matching the object or tissue to be cooled. For example, a metal plug can be installed in the tip of the probe or catheter, for applying cooling through the extreme distal tip of the probe or catheter. Alternatively, a relatively narrow metal strip can be mounted in a side wall of the probe or catheter, near the distal tip, for applying cooling to a narrow strip of tissue.

The method of operating the apparatus described above includes the selection of an optimum gas mixture for use as the cooling medium. In the miniature environments envisioned for the use of this apparatus, severe size limitations will be placed upon the apparatus used. For instance, a probe or cardiac catheter necessarily is severe ly limited in diameter.

Therefore, the system be optimized by selection of a gas mixture which will have the appropriate thermodynamic properties to perform as well as possible. The goal of this selection process is to maximize the cooling power of the combination of the heat exchanger and the Joule-Thomson expansion element. For a given gas mixture operating between selected high and low pressures and between selected high and low temperatures, there is a limit to the amount of heat which can be transferred, (even in a perfect heat exchanger. The present invention provides a mixture which will maximize the performance ratio between the refrigeration power of the Joule-Thomson expansion element and the heat transfer capacity of a perfect heat exchanger.

DETAILED DESCRIPTION OF THE INVENTION

A key to the success of a miniature cryosurgical instrument lies in the selection of an optimum fluid mixture, since no known single gasses are capable of achieving the necessary cooling capacity at the required temperatures, given the size limitations and pressure limitations imposed on systems intended for use in the selected applications. Some fluid mixtures function significantly better than other mixtures, so it is important to be able to identify and select an optimum mixture.

The size and inherent heat transfer capacity of the heat exchanger are limited, regardless of the design used. In the miniature environments envisioned for the use of this apparatus, space is at a premium. Therefore, severe size limitations will be placed upon the heat exchanger. Limiting the size of the heat exchanger, of course, will result in a commensurate limitation of the amount of heat which can be transferred in the heat exchanger. This type of severe limitation on the size and capacity of the heat exchanger requires the overall refrigeration system to be kept at the highest possible level of performance by the selection of an optimum gas mixture. The optimun gas or fluid mixture will have thermodynamic properties which allow the system to perform cooling as well as possible, in spite of the size limitations. The goal of selecting the optimum fluid mixture is to maximize the cooling power of the combination of the heat exchanger and the Joule-Thomson expansion element.

For any particular gas mixture, and for any selected pressure range and temperature range, there is a theoretical limit to the amount of heat which can be transferred, even in a perfect heat exchanger. That limit is given by the equation $$Q_{hx} = n[h(P,T_h) - h(P,T_c)]_{min}$$

where n is the molar flow rate, h is the molar enthalpy, $T_h$ is the temperature at the hot end of a heat exchanger, $T_c$ is the temperature at the cold end of the heat exchanger, and P is the pressure, with the value of $Q_{hx}$ being calculated at both the high pressure and the low pressure. The subscript $min$ denotes the fact that the value of $Q_{hx}$ used is the lesser of the values computed at the two pressures.

Similarly, for that particular fluid mixture, and for that particular pressure and temperature range, there is a theoretical limit to the refrigeration power which can be achieved by even a perfect Joule-Thomson expansion element. That limit is given by the equation $$Q_r = n[h(P_l,T) - h(P_h,T)]_{min}$$

where $P_l$ is the low pressure, $P_h$ is the high pressure, and T is the temperature, with the value of $Q_r$ being calculated at a plurality of selected temperatures between the low and high temperatures at the extremes of the selected temperature range. The subscript min denotes the fact that the value of $Q_r$ used is the lowest of the values computed at the plurality of selected temperatures.

The ratio of the theoretical refrigeration power to the theoretical heat transfer capacity, or $Q_r/Q_{hx}$, can be thought of as a performance ratio which is characteristic of that particular fluid mixture, over that particular pressure and temperature range. It is also beneficial to include a component in the gas mixture which is a relatively strong solvent, to minimize plugging of the system, such as at the J-T expansion element, which is the smallest constriction in the system, and which has the lowest temperature in the system. A suitable solvent for this purpose is R-116. With these principles in mind, it has been found that an optimum fluid mixture for this application includes Krypton, the refrigerant R-22, the refrigerant R-23, and the refrigerant R-116, in appropriate concentrations. Specifically, with concentrations given in volume based fractions, the optimum gas mixture will consist of 42% to 52% Krypton, 1% to 15% R-22, 15% to 35% R-23, and 10% to 20% R-116.

While the particular invention as herein shown and disclosed in detail is fully capable of fulfilling the objects previously stated, it is to be understood that this disclosure is merely an illustration of the presently preferred embodiments of the invention and that no limitations are intended other than those described in the appended claims.

We claim:

1. A fluid mixture for use in Joule-Thomson refrigeration, consisting essentially of 42% to 52% Krypton, up to 15% R-22, 15% to 35% R-23, and 10% to 20% R-116, wherein the concentrations are given in volume based fractions.

2. A fluid mixture for use in Joule-Thomson refrigeration, consisting of 42% to 52% Krypton, up to 15% R-22, 15% to 35% R-23, and 10% to 20% R-116, wherein the concentrations are given in volume based fractions.

* * * * *